United States Patent [19]

Pahlman et al.

[11] 4,208,379

[45] * Jun. 17, 1980

[54] RECOVERY OF METALS FROM ATLANTIC SEA NODULES

[75] Inventors: John E. Pahlman, Bloomington; Sanaa E. Khalafalla, Minneapolis, both of Minn.

[73] Assignee: The United States of America as represented by the Secretary of the Interior, Washington, D.C.

[*] Notice: The portion of the term of this patent subsequent to Feb. 6, 1995, has been disclaimed.

[21] Appl. No.: 27,135

[22] Filed: Apr. 4, 1979

[51] Int. Cl.² .............. C01G 45/00; C01G 51/00; C01G 53/00
[52] U.S. Cl. ................................ 423/49; 423/27; 423/150; 423/DIG. 4
[58] Field of Search ............. 423/27, 150, 49, DIG. 4; 75/101 R

[56] References Cited

U.S. PATENT DOCUMENTS

| 305,524 | 9/1884 | Mathieu | 75/101 R |
| 2,187,750 | 1/1940 | Marvin | 423/22 |
| 3,923,615 | 12/1975 | Kane | 423/DIG. 4 |
| 4,138,465 | 2/1979 | Pahlman | 423/150 |

OTHER PUBLICATIONS

Brooke, J. et al., "Manganese Nodules as a Source of Copper and Nickel—Minerological Assessment and Extraction" *Transactions,* Institution of Mining and Metallurgy, (London), vol. 78, 1969, pp. 64–73.

*Primary Examiner*—Brian E. Hearn
*Attorney, Agent, or Firm*—William S. Brown; Donald A. Gardiner

[57] ABSTRACT

Nickel, cobalt and manganese are selectively recovered from Atlantic deep sea nodules by means of a preliminary treatment with acetic acid, followed by leaching with sulfurous acid.

6 Claims, 2 Drawing Figures

RECOVERY OF METALS FROM ATLANTIC SEA NODULES

Applicants' application Ser. No. 860,249, filed Dec. 13, 1977, now U.S. Pat. No. 4,138,465, the disclosure of which is incorporated herein by reference, discloses a process for recovery of metal values from sea nodules by leaching with dilute sulfurous acid. More specifically, the process employs particular values of nodule particle size and amount of $SO_2$ to achieve rapid and selective extraction of nickel, cobalt and manganese at ambient conditions. This process has been found to be very effective in recovery of metal values from Pacific sea nodules, i.e., deep sea nodules of the Pacific ocean floor, but less effective for similar metal recoveries from Atlantic sea nodules. This distinction is believed due to the difference in nodule mineralogy, the principal gangue material of the Pacific nodules being silica, while that of the Atlantic nodules is calcium and magnesium carbonates as well as carbonaceous material.

It has now been found, according to the present invention, that the deficiencies of the process of the above-mentioned application may be largely overcome by means of a pretreatment of the Atlantic nodules with acetic acid. The effectiveness of this pretreatment is believed due to leaching of much of the calcareous and carbonaceous materials from the nodules, thereby lessening consumption of $SO_2$ and improving leachability of nickel, cobalt and manganese from the Atlantic sea nodules.

Figure 1:
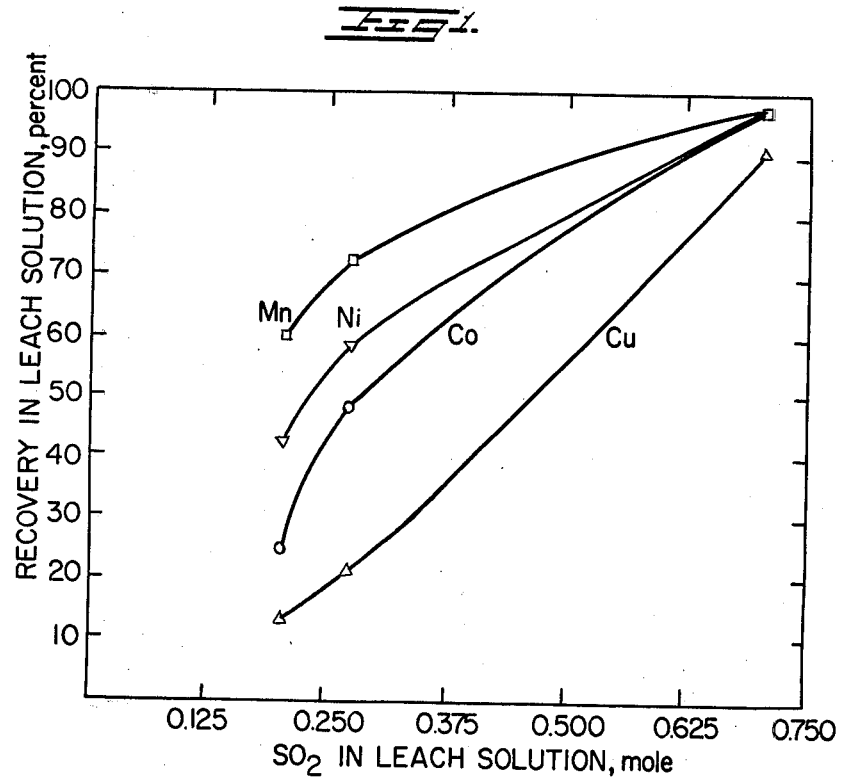
FIG. 1 graphically illustrates $SO_2$ leaching of untreated Atlantic nodules.

The nodules are initially ground to a particle size less than about 100 mesh, and preferably less than about 200 mesh. This particle size not only improves the efficiency of the acetic acid treatment, but is also important to the selectivity, sensitivity, and rapidity of the subsequent sulfurous acid leaching process, as discussed in the above-mentioned application. The finely ground nodules are then slurried at ambient conditions with a solution of acetic acid for a time sufficient to leach substantial amounts of the calcareous and carbonaceous gangue.

The acetic acid is employed in the form of a dilute aqueous solution. Optimum concentration of the acid solution will depend on the specific composition and particle size of the nodules; however, a concentration of about 0.75 to 0.85 Molar has generally been found to be effective. Optimum amounts of the acetic acid solution will also depend on the specific nodules, as well as the strength of the acid. An amount of the aqueous acetic acid solution of about 4.5 to 5.5 ml per gram of nodule, based on the total weight of the nodules, is, however, generally effective.

Optimum time of the treatment with the weak acid solution will also vary with the above-mentioned factors. However, a period of about 1 to 1.5 hr has generally been found to give good results. The slurry is then filtered, and the residue preferably washed with distilled water to remove excess acid and reaction products.

The weak acid-treated nodules are then treated, at ambient conditions and for a period as little as ten minutes, with a leach solution consisting of dilute sulfurous acid, as described in the above-mentioned application. As discussed therein, a concentration of about 6 to 8 percent of $SO_2$ in water is generally satisfactory, although the amount of $SO_2$ in the leach solution, rather than concentration of $SO_2$, is the important factor in the sulfurous acid leaching step. As discussed in detail in the above-mentioned application, the amount of $SO_2$ should be sufficient to react with and solubilize substantially all of any nickel, cobalt and manganese in the nodule particles, without appreciable reaction with copper, iron or aluminum. This can be accomplished by use of an amount of dilute sulfurous acid sufficient to provide a ratio of moles of $SO_2$ in the leach solution to the total weight of the nodules, in grams, in the range of about $1.25 \times 10^{-2}$ to $2.0 \times 10^{-2}$. Recovery of metal values from the leach solution and residue are readily accomplished by methods discussed in applicants' above-mentioned application.

The process of the invention, and its advantages, will be more specifically illustrated by means of the following examples.

EXAMPLE 1

Four-hundred grams of minus 200 mesh calcareous Atlantic sea nodules containing the following quantities of elements in grams: 46 Fe, 61.6 Mn, 16.8 $Al_2O_3$, 16.4 MgO, 56.4 CaO, 15.6 $SiO_2$, 70 $CO_3^=$, 0.52 Cu, 2.04 Ni, and 1.20 Co were reacted at room temperature with 2 liters of 0.8 M acetic acid for 1 hour. The slurry was filtered and the residue washed with distilled water. Analyses of the residue (314 grams) showed that 33.0, 42.1, and 35.0 percent of the Mg, Ca, and $CO_3^=$, respectively, had been leached while essentially all of the other elements remained in the residue.

Twenty grams of this acetic acid leach residue were reacted with 200 ml of water containing 0.42 moles of $SO_2$ for 10 minutes. The solution was filtered and the residue was washed with distilled water. Analysis of the residue for nickel, cobalt, copper, manganese, iron, aluminum, calcium and magnesium showed solution recoveries of 89.2, 95.3, 49.6, 95.7, 40.8, 54.6, 78.4, and 86.4 percent, respectively. Thus, nickel, cobalt, and manganese are efficiently leached in an aqueous solution containing 0.42 moles (27 grams) of $SO_2$ after pretreatment of the sea nodules with acetic acid.

EXAMPLE 2

The beneficial effect of acetic acid pretreatment on subsequent sulfurous acid leaching characteristics was investigated by leaching experiments on untreated Atlantic nodules. These tests involved leaching 20 grams of minus 200 mesh untreated sea nodules with 200 ml of sulfurous acid containing 0.20, 0.27, and 0.70 moles of $SO_2$, respectively. The mixture was filtered at the end of each 10-minute test and the residues were used to determine the solution recoveries given in Table 1 and graphically illustrated in FIG. 1. In addition to the sluggishness of leaching, the selectivity that is outstanding in the leaching of siliceous Pacific nodules with $SO_2$ is largely lost in the case of the calcareous Atlantic nodules.

TABLE 1

| Test No. | SO$_2$ in solution, moles | Percent recovered in leach solution | | | | | | | | |
|---|---|---|---|---|---|---|---|---|---|---|
| | | Mn | Ni | Co | Cu | Fe | Al | Mg | Ca | Wt |
| 1 | 0.20 | 60.0 | 42.8 | 24.9 | 13.3 | 3.7 | 4.0 | 40.0 | 43.6 | 33.7 |
| 2 | .27 | 72.5 | 59.0 | 48.2 | 21.6 | 19.4 | 20.9 | 62.1 | 57.0 | 46.4 |
| 3 | .70 | 98.4 | 97.6 | 98.1 | 91.1 | 77.1 | 73.9 | 94.3 | 92.4 | 85.4 |

EXAMPLE 3

Figure 2:
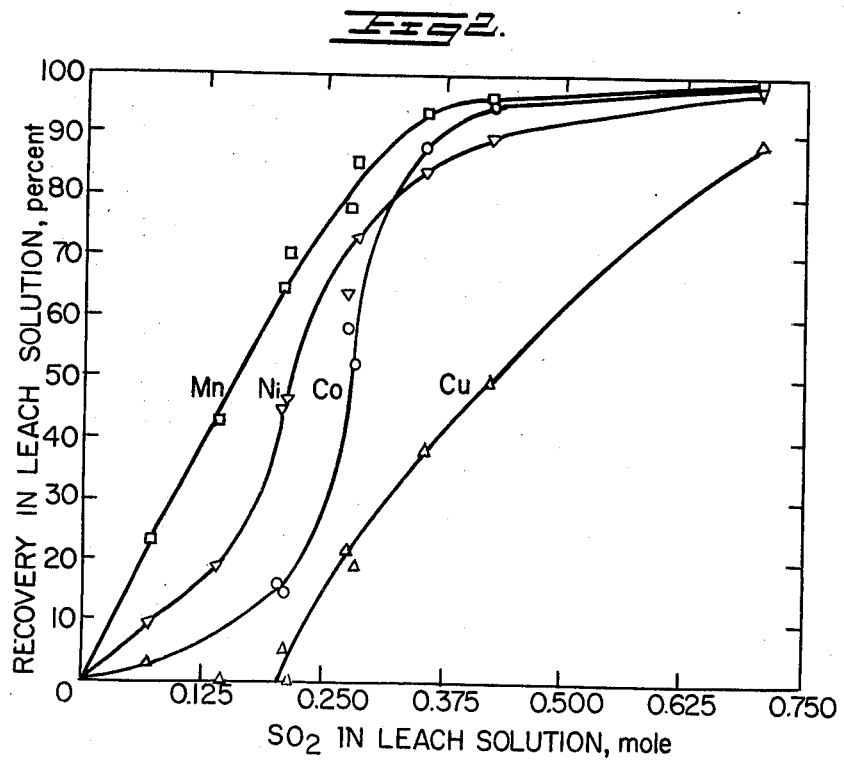
FIG. 2 graphically illustrates $SO_2$ leaching of acetic acid pretreated nodules.

The effect of the moles of SO$_2$ present in the sulfurous acid leach solution on metal recovery from the acetic acid-pretreated nodules was investigated further by additional leaching experiments. These tests involved leaching 20 grams of the minus 200 mesh acetic acid leach residue of Example 1 with 200 ml of water containing various quantities of SO$_2$. The mixture was filtered at the end of each 10-minute test and the residues were used to determine the solution recoveries given in Table 2 and graphically illustrated in FIG. 2. Comparison of FIGS. 1 and 2 show that both the sensitivity and selectivity of leaching manganese, nickel, and cobalt is enhanced by pretreatment with acetic acid. By judicious choice of the quantity of SO$_2$ in the leach solution the leaching of manganese, nickel, and cobalt can be maximized while the contamination from copper, iron, and aluminum is minimized.

TABLE 2

| Test No. | SO$_2$ in solution, moles | Percent recovered in H$_2$SO$_3$ leach solution | | | | | | | | |
|---|---|---|---|---|---|---|---|---|---|---|
| | | Mn | Ni | Co | Cu | Fe | Al | Mg | Ca | Wt |
| 1 | 0.07 | 23.4 | 9.3 | 2.7 | 3.5 | 0.0 | 2.2 | 14.9 | 41.0 | 14.9 |
| 2 | .14 | 43.2 | 19.1 | 0.0 | 0.0 | 0.0 | 0.0 | 25.9 | 42.9 | 16.3 |
| 3 | .20 | 64.8 | 45.1 | 16.0 | 4.3 | 4.5 | 8.4 | 47.3 | 54.0 | 31.7 |
| 4 | .21 | 70.5 | 46.5 | 14.9 | 0.7 | 0.0 | 0.0 | 45.3 | 57.0 | 29.0 |
| 5 | .27 | 78.2 | 64.2 | 58.4 | 21.5 | 15.9 | 17.7 | 60.0 | 61.7 | 43.9 |
| 6 | .28 | 85.5 | 72.9 | 52.7 | 19.1 | 17.2 | 16.7 | 60.6 | 67.1 | 44.8 |
| 7 | .35 | 93.6 | 84.1 | 88.0 | 38.2 | 29.4 | 40.0 | 69.9 | 74.9 | 57.9 |
| 8* | .42 | 95.7 | 89.2 | 95.3 | 49.6 | 40.8 | 54.6 | 78.4 | 86.4 | 67.1 |
| 9 | .70 | 98.9 | 97.7 | 98.3 | 89.2 | 67.1 | 67.4 | 91.7 | 88.5 | 80.0 |

*Example 1

We claim:

1. A process for recovery of metal values from Atlantic sea nodules comprising nickel, cobalt, manganese, copper, iron and aluminum, said process consisting essentially of (1) reducing the nodules to a particle size of less than about 100 mesh, (2) pretreating the nodule particles with a dilute aqueous solution of acetic acid for a time sufficient to leach a substantial quantity of calcareous and carbonaceous material from the nodules, and (3) leaching the pretreated nodules with dilute sulfurous acid to selectively extract nickel, cobalt and manganese, while leaving the major proportion of the copper, iron, and aluminum in the residue.

2. The process of claim 1 in which the nodules are initially reduced to a particle size of minus 200 mesh.

3. The process of claim 1 in which the sulfurous acid leaching is carried out in a period of about 10 minutes or less.

4. The process of claim 1 in which both steps (2) and (3) are carried out at ambient temperature and pressure.

5. The process of claim 1 in which the selectivity of the sulfurous acid leaching in step (3) is achieved by adjustment of the ratio of moles of SO$_2$ in the leach solution to the total weight of the nodules.

6. The process of claim 1 in which the ratio of moles of SO$_2$ in the leach solution in step (3) to the total weight of the nodules, in grams, is in the range of about $1.25 \times 10^{-2}$ to $2.0 \times 10^{-2}$.

* * * * *